(12) United States Patent
Gosmann

(10) Patent No.: US 7,041,181 B2
(45) Date of Patent: May 9, 2006

(54) COATED STEEL PART WITH REGIONS OF DIFFERENT DUCTILITY

(75) Inventor: Stefan Gosmann, Bad Wünnenberg (DE)

(73) Assignee: Benteler Automobil Technik GmbH, Paderborn (DE)

( * ) Notice: Subject to any disclaimer, the term of this patent is extended or adjusted under 35 U.S.C. 154(b) by 20 days.

(21) Appl. No.: 10/744,773

(22) Filed: Dec. 23, 2003

(65) Prior Publication Data

US 2004/0134570 A1 Jul. 15, 2004

(30) Foreign Application Priority Data

Jan. 6, 2003 (DE) ................... 103 00 371

(51) Int. Cl.
*B32B 15/18* (2006.01)
*B32B 3/10* (2006.01)
*C23C 2/02* (2006.01)
*C23C 2/34* (2006.01)
*C21D 1/48* (2006.01)

(52) U.S. Cl. ............... 148/537; 148/531; 148/533; 148/902; 427/431; 427/433; 428/614; 428/659; 428/653; 428/939

(58) Field of Classification Search ............ 428/614, 428/659, 653, 684, 939; 148/537, 531, 533, 148/902; 427/431, 433
See application file for complete search history.

(56) References Cited

U.S. PATENT DOCUMENTS

| | | | | |
|---|---|---|---|---|
| 4,170,495 A | * | 10/1979 | Talikka | 148/533 |
| 5,256,219 A | * | 10/1993 | von Hagen et al. | 428/659 |
| 5,972,134 A | * | 10/1999 | Buschsieweke et al. | 148/567 |
| 6,524,404 B1 | * | 2/2003 | Gehringhoff et al. | 148/320 |
| 2004/0159378 A1 | * | 8/2004 | Gehringhoff | 148/533 |
| 2005/0109433 A1 | * | 5/2005 | Danger et al. | 148/533 |

FOREIGN PATENT DOCUMENTS

| | | | |
|---|---|---|---|
| AU | 9944717 | * | 3/2000 |
| JP | 60-021318 | * | 2/1985 |
| JP | 60-021320 | * | 2/1985 |
| JP | 2001-303180 | * | 10/2001 |
| JP | 2003-013177 | * | 1/2003 |

* cited by examiner

*Primary Examiner*—John J. Zimmerman
(74) *Attorney, Agent, or Firm*—Herbert Dubno; Andrew Wilford

(57) ABSTRACT

A hardenable steel workpiece having two regions is first hardened so that both regions are of generally the same low ductility. Then only one of the regions is hot coated so as to increase the ductility of the one region while not heating and changing the ductility of the other region. The workpiece can be hardened by hot working or tempering. The hot coating can be done by dipping the one region in molten zinc.

6 Claims, 1 Drawing Sheet

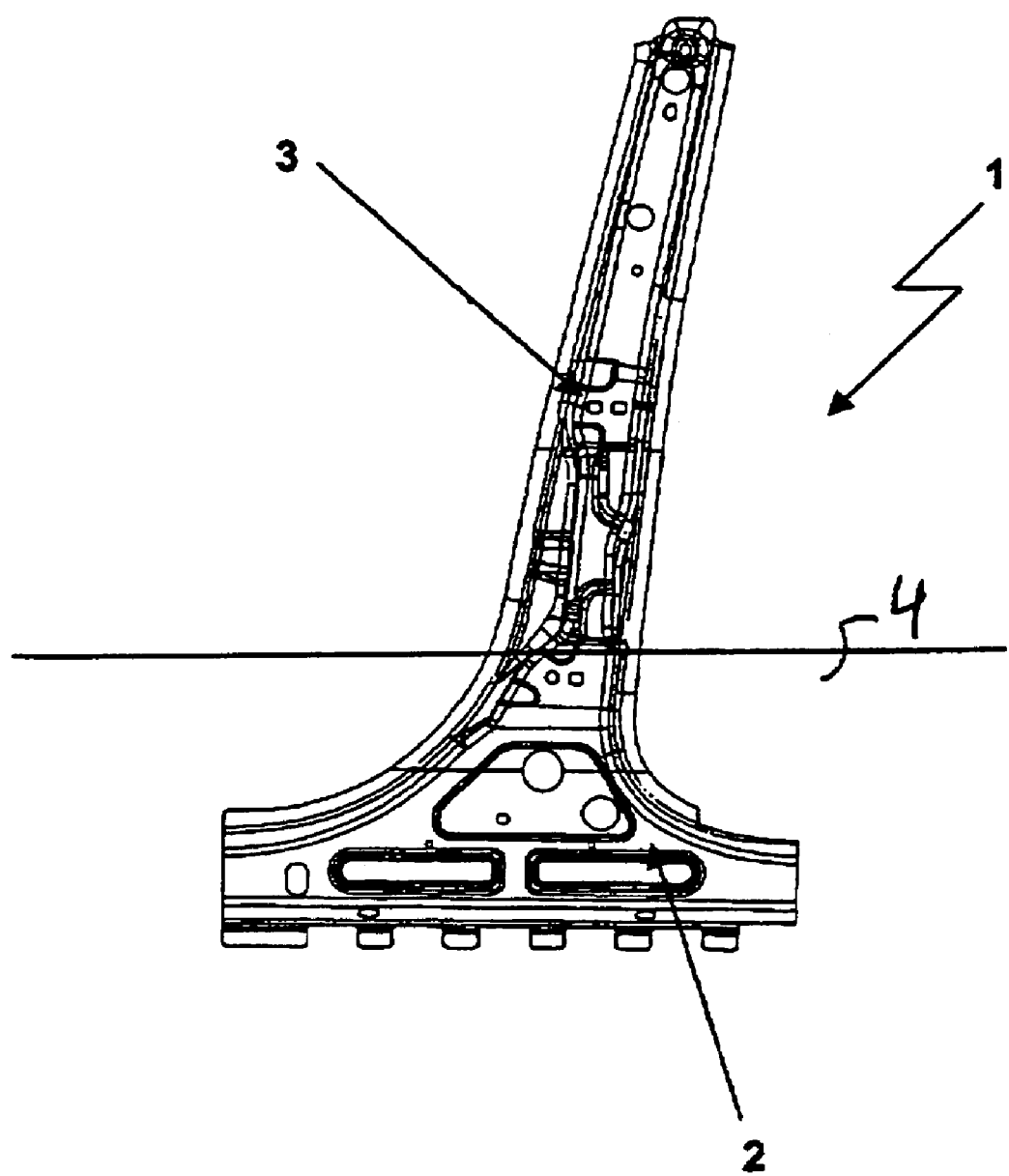

COATED STEEL PART WITH REGIONS OF DIFFERENT DUCTILITY

FIELD OF THE INVENTION

The present invention relates to a steel part and method of making same. More particularly this invention concerns a steel part having regions of different hardness and/or ductility.

BACKGROUND OF THE INVENTION

It is known to make various motor-vehicle parts—e.g. tie rods, B-columns, struts, door beams—of hardened steel with uniform ductility and grain structure throughout the entire workpiece. This is accomplished by a heat treatment of the part, raising it to a predetermined temperature and then quenching it in accordance with the desired characteristics of the finished product. The main factor affecting grain structure and/or ductility is the maximum temperature to which the workpiece is heated, that is whether or not it reaches any of several critical temperatures, the so-called $AC_1$–$AC_4$ points.

For specific parts, however, it is desirable for the grain structure to vary from one region to another. One region might need to have exceptional strength while another might need to be able to deform somewhat. This can be accomplished most simply by making the part as a composite of two pieces that are differently treated to have the desired characteristics.

U.S. Pat. No. 5,972,134 describes a one-piece part having regions of different ductility. It is produced by heating it locally before deforming it into the desired shape and then cooling it. The disadvantage of this method is that it is a complex batch operation that does not lend itself to the mass production needed for motor-vehicle manufacture.

German utility model 200 14 361 published Nov. 16, 2000 describes a door post or so-called B-column that is rendered austenitic in a furnace and then is simultaneously deformed and quenched in a die. Some parts of the workpiece are insulated before it is put in the furnace so that they do not become austenitic and thus do not when hardened develop a martensitic grain structure. Such a process is also unwieldy, involving the application and removal of insulation before and after the heat treatment, two extra steps that considerably elevate the cost of the workpiece.

Complicating the problem of making a part with regions of different ductility is the necessity of coating one of the parts, in particular when a corrosion-resistant coating, like zinc or aluminum, is applied hot. When a workpiece needs to be constructed having two regions of different ductility and also needs to be corrosion coated, the problems multiply, making for a very expensive manufacturing process.

OBJECTS OF THE INVENTION

It is therefore an object of the present invention to provide an improved corrosion-protected workpiece with regions of different ductility.

Another object is the provision of such an improved corrosion-protected workpiece with regions of different ductility which overcomes the above-given disadvantages, that is which is relatively simple and inexpensive.

SUMMARY OF THE INVENTION

A hardenable steel workpiece having two regions is first hardened so that both regions are of generally the same low ductility. Then only one of the regions is hot coated so as to increase the ductility of the one region while not heating and changing the ductility of the other region.

Thus according to the invention the workpiece is first hardened by hot working or tempering. Subsequently but at the same time the one region is locally coated while its hardness is decreased or ductility is increased by a hot process. In this manner only two steps are required to produce a finished product having two regions of different ductility, one of which is coated. The instant invention eliminates a complex zone-hardening procedure. Instead the entire workpiece is raised to the hardness desired for the harder region, then the region that needs to be softer is hot-coated in such a manner, depending on the type of steel, as to reduce its hardness. The initial hardening can be done as a continuous process in a standard tunnel oven or by hot working.

According to the invention hot coating can be done by dipping the one region in molten zinc or zinc alloy having a temperature or 400° C. to 650° C. Alternatively it can be done in a bath of aluminum or an aluminum alloy, e.g. AlSi.

The instant invention is particularly useful in the production of a window post or B-column for a motor vehicle. Such a column, as described in copending application 10/726,817 filed Dec. 2, 2003, ideally has a very hard and strong upper region and a more ductile lower region. This lower region is often exposed so that it needs an anticorrosion coating. Thus the entire B-column is rendered very hard, then its foot is dipped in molten zinc or aluminum to simultaneously coat and soften it.

BRIEF DESCRIPTION OF THE DRAWING

The above and other objects, features, and advantages will become more readily apparent from the following description, reference being made to the accompanying drawing whose sole figure is a schematic side view illustrating the workpiece and method of this invention.

SPECIFIC DESCRIPTION

As seen in the drawing a part or workpiece 1, here a motor-vehicle B-column, has a lower region 2 that is of relatively low ductility and coated, and an upper region 3 that is quite hard. This effect is achieved by dipping the workpiece 1, after hardening all of it, in a bath 4 of molten zinc.

More particularly the part 1 is of steel with the following composition by weight:
 0.18%–0.3% carbon,
 0.1%–0.7% silicon,
 1.0%–2.5% manganese,
 up to 0.025% phosphorus,
 up to 0.8% chromium,
 up to 0.5% molybdenum,
 up to 0.01% sulfur,
 0.02–0.05% titanium,
 0.002%–0.005% boron,
 0.01%–0.06% aluminum, and
 balance iron.

Optionally the part 1 can contain 0.03%–0.05% niobium as corrosion protector.

The part 1 is shaped hot and then hardened so as to have throughout a martensitic grain structure with a hardness of at least 1400 N/mm². The bath 4 has a temperature of about 450° C. so as to reduce the hardness of the foot region 2 to about 1100 N/mm².

If desired, the bath 4 can be at 620° C. so as to reduce the strength of the region 2 to a relatively ductile 820 N/mm². Either way the ductility of bend-to-break is reduced in the foot 2 by up to 20%. Thus the normally exposed foot region 2 of the part 1 will be able to bend in a crash, and is also protected by its coating against corrosion.

I claim:

1. A method of treating a hardenable steel workpiece having two regions, the method comprising the steps of:
    hardening the workpiece so that both regions are of generally the same low ductility; and
    thereafter dipping only one of the regions in a bath of a molten coating metal and thereby hot coating only the one region and simultaneously increasing the ductility of the one region while not heating, coating, and changing the ductility of the other region.

2. The method defined in claim 1 wherein the workpiece is hardened by hot working.

3. The method defined in claim 1 wherein the workpiece is hardened by tempering.

4. The method defined in claim 1 wherein the coating metal is zinc.

5. The method defined in claim 1 wherein the coating metal is aluminum.

6. The method defined in claim 1 wherein the workpiece is a B-column.

* * * * *